United States Patent [19]

Leatherwood et al.

[11] 4,413,522
[45] Nov. 8, 1983

[54] RIDE QUALITY METER

[75] Inventors: Jack D. Leatherwood; Thomas K. Dempsey, both of Hampton; Sherman A. Clevenson, Newport News; David G. Stephens, Yorktown, all of Va.

[73] Assignee: The United States of America as represented by the Administrator of the National Aeronautics and Space Administration, Washington, D.C.

[21] Appl. No.: 267,179

[22] Filed: May 22, 1981

[51] Int. Cl.³ .......................................... G01N 29/00
[52] U.S. Cl. ....................................... 73/646; 73/658; 364/415
[58] Field of Search ................. 73/584, 645, 646, 647, 73/648, 649, 658, 659, 602, 517 R, 510; 364/508, 506, 413, 415, 418

[56] References Cited

U.S. PATENT DOCUMENTS

| | | | |
|---|---|---|---|
| 2,034,649 | 3/1936 | Brown | 73/517 R |
| 3,200,899 | 8/1965 | Krauss | 73/647 |
| 3,326,036 | 6/1967 | Hoeppner | 73/659 |
| 3,856,991 | 12/1974 | Kirkland, Jr. et al. | 73/646 |

*Primary Examiner*—Stephen A. Kreitman
*Attorney, Agent, or Firm*—Howard J. Osborn; John R. Manning; William H. King

[57] ABSTRACT

The invention is a ride quality meter that automatically transforms vibration and noise measurements into a single number index of passenger discomfort. The noise measurements are converted into a noise discomfort value. The vibrations are converted into single axis discomfort values which are then converted into a combined axis discomfort value. The combined axis discomfort value is corrected for time duration and then summed with the noise discomfort value to obtain a total discomfort value.

8 Claims, 7 Drawing Figures

RIDE QUALITY METER

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

The invention relates generally to passenger ride discomfort and more specifically concerns a tool for estimating passenger ride discomfort within complex ride environments.

The prior art methods and devices for measuring passenger ride discomfort generally measure and display individual vertical or lateral accelerations that are frequency weighted according to ride comfort curves derived from motion sickness data and the International Standards Organization recommendations. These devices and methods output a weighted value of acceleration for either of the two axes of motion. The resultant weighted acceleration level is usually interpreted in a dichotomous manner, i.e., representing a ride that is comfortable or uncomfortable.

The disadvantages of the prior art include the following. The output of existing devices and methods is a frequency weighted value of physical acceleration which does not necessarily relate on a one-to-one basis with the associated subjective experience of the measured environment. For example, many different vibrations (which produce large variations in subjective discomfort) can have identical weighted acceleration levels. Thus, a weighted output of these devices and methods does not generally represent a single unique level of subjective discomfort/acceptance. Existing devices and methods are limited to the production of comfort indices for single axes of vibration. They cannot provide reliable estimates of discomfort due to simultaneous vibrations in more than one axis of vibration. They canot adequately assess the effect upon subjective discomfort of multiple frequencies of vibration within individual axes; they do not account for the interaction and/or summation of the effects of combined noise and fibration upon human discomfort/acceptance; they do not incorporate the effects of angular vibrations, either singly or in combination with linear vibrations; and they do not account for adaptation of passengers to the vibration environment.

It is an object of this invention to provide a ride quality meter in which simultaneous measurements of interior noise and vibrations in the transportation system are used.

Another object of this invention is to utilize the combined noise and vibration measurements, together with empirically derived psychophysical laws governing human discomfort response to combined noise and vibration to generate and display, in real time, an index of passenger discomfort that directly relates to passenger subjective acceptance of the measured ride environment.

A further object of this invention is to display at the option of the user, the contribution of the various components of the ride environment to the total discomfort experienced by passengers.

Still another object of this invention is to provide a ride quality meter in which the effects of multiple frequencies and multiple axes of vibration are automatically accounted for within the meter.

Other objects of this invention will become apparent hereinafter in the specification and drawings.

SUMMARY OF THE INVENTION the invention is a ride quality meter that provides a value which is indicative of the discomfort that a passenger will experience during a ride on a passenger vehicle.

A transducer box containing accelerometers is placed on the vehicle such that electrical signals are produced that are proprotional to the vehicle vertical, lateral, longitudinal, roll and pitch accelerations. A microphone on the vehicle produces an electrical signal proportional to noise. The electrical signal proportional to noise is divided into several octave bands and then applied to a noise discomfort computer which computes a noise discomfort value.

The electrical signals from the accelerometers are applied through a fast Fourier transform signal analyzer and computers to obtain single axis discomfort values. These values are combined by computer means to obtain a combined axis discomfort value. The combined axis discomfort value is corrected for time duration and then summed with the noise discomfort value to obtain a total discomfort value which is displayed on a display means.

DETAILED DESCRIPTION OF THE INVENTION

Figure 1:
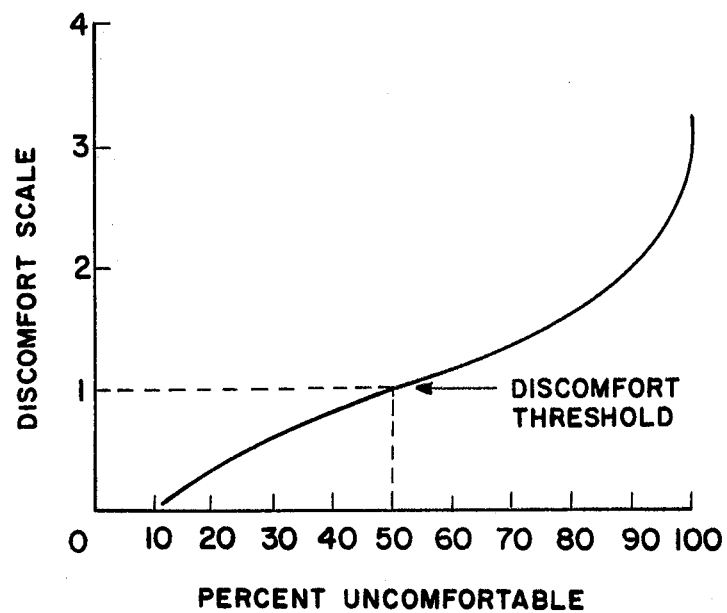
FIG. 1 is a graph of discomfort as a function of percent of passengers uncomfortable.

This invention is the result of a program utilizing approximately 2200 test subjects in the development of a generalized ride comfort model for engineering design/analysis applications. The model provides a single numerical descriptor of passenger discomfort which is measured along a ratio scale of discomfort that is anchored at discomfort threshold. This discomfort scale is illustrated in FIG. 1, which shows the relationship between the discomfort scale (ordinate) and the coresponding percentage (abscissa) of passengers who would rate that discomfort level as being uncomfortable. A value of unity along the discomfort scale corresponds to discomfort threshold, i.e., 50% of the passengers would be uncomfortable.

Figure 2:
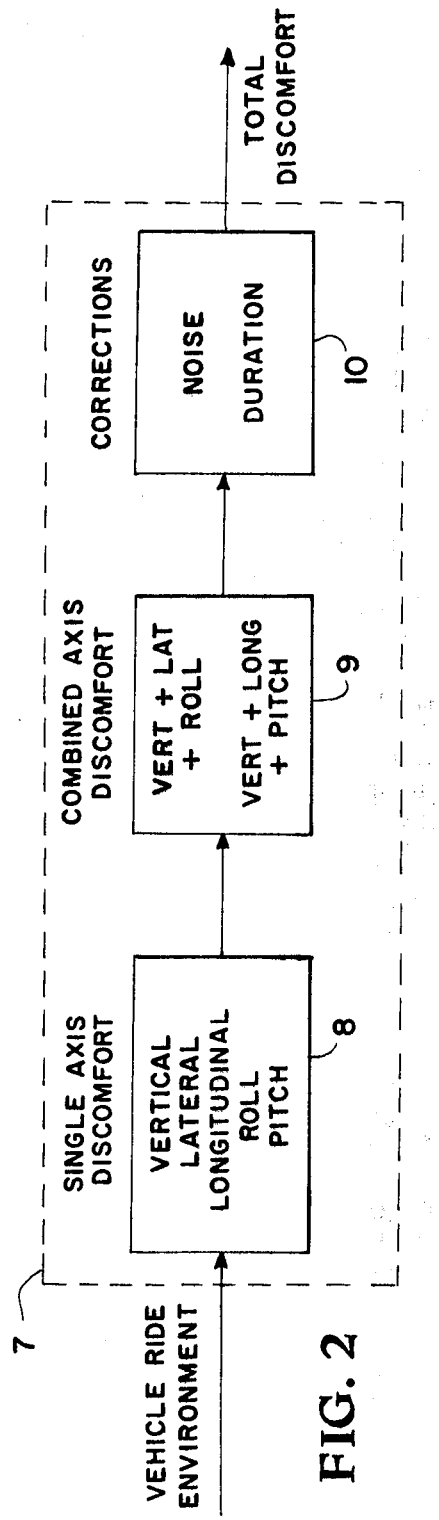
FIG. 2 is a block diagram of the concept of the invention.

The ride comfort model concept of this invention is illustrated in FIG. 2. The model 7 shown enclosed by the dashed lines consists of three basic elements: (1) empirical estimation of discomfort due to sinusoidal and/or random vibrations within single axes 8; (2) empirical estimation of the discomfort due to vibration in combined axes 9; and (3) application of empirically determined corrections for the effects of interior noise and duration of vibration 10. Input to the model is the vehicle ride environment, and output of the model is the total discomfort measured along the discomfort scale of FIG. 1. Each of the model elements is discussed in detail below.

Single axis discomfort to sinusoidal vibration: Discomfort responses of passenger subjects to vibrations applied in each of five axes of motion (vertical, lateral, longitudinal, roll, and pitch) were obtained and modeled in a recent study. Responses to sinusoidal vibration were obtained only for the vertical, lateral, and roll axes of motion, since sinusoidal pitch and longitudinal vibrations were not considered typical of actual vehicle ride environments. The equations developed for describing discomfort response to sinusoidal motions are given by:

$$D_s = a + bX_p; \text{ for } X_p \geq X \quad (1a)$$

$$D_s = cX_p; \text{ for } X_p < X \quad (1b)$$

where $D_s$ = discomfort due to a sinusoidally applied vibration;

$X_p$ = peak linear (in g units) or angular (rad/s$^2$) for roll acceleration level;

$X$ = 0.06 g for linear (vertical and lateral) sinusoidal acceleration, 0.50 rad/s$^2$ for roll acceleration; and a,b,c, = empirical constants which depend upon the axis and frequency of the sinusoidal vibration.

Values of a, b, and c, the coefficients of equations (1a) and (1b), are given in Table 1 below for sinusoidal vertical, lateral, and roll vibration, respectively.

TABLE 1

| Frequency, Hz | a | b | c |
|---|---|---|---|
| (a) Vertical Sinusoidal | | | |
| 1 | .3946 | 8.8296 | 15.41 |
| 2 | −.3713 | 15.2731 | 9.08 |
| 3 | −.7685 | 21.4441 | 8.64 |
| 4 | −1.0028 | 27.1273 | 10.41 |
| 5 | −1.2352 | 32.2146 | 11.63 |
| 6 | −.7592 | 28.8279 | 16.17 |
| 7 | −.7188 | 27.4856 | 15.51 |
| 8 | −.0576 | 19.8988 | 18.94 |
| 9 | −.8919 | 21.9987 | 7.31 |
| 10 | −1.2718 | 22.9530 | 1.76 |
| 11 | −.6912 | 16.9931 | 5.47 |
| 12 | −.4937 | 14.0437 | 5.82 |
| 13 | −.3695 | 12.0297 | 5.87 |
| 14 | −.3470 | 10.7501 | 4.97 |
| 15 | −.5220 | 10.4234 | 1.72 |
| 16 | −.1406 | 8.3656 | 6.02 |
| 17 | .1650 | 6.8997 | 9.65 |
| 18 | −.2190 | 7.5948 | 3.94 |
| 19 | −.3326 | 7.5326 | 1.99 |
| 20 | .0986 | 6.1421 | 7.79 |
| 21 | −.1989 | 6.7045 | 3.39 |
| 22 | −.1769 | 6.5021 | 3.55 |
| 23 | .0345 | 5.9102 | 6.49 |
| 24 | −.0465 | 6.0773 | 5.30 |
| 25 | .0494 | 5.8456 | 6.67 |
| 26 | .0010 | 6.0208 | 6.04 |
| 27 | −.0684 | 6.2664 | 5.13 |
| 28 | −.1695 | 6.6472 | 3.82 |
| 29 | −.0324 | 6.4483 | 5.91 |
| 30 | −.0766 | 6.7358 | 5.46 |
| (b) Lateral Sinusoidal | | | |
| 1 | −0.8322 | 26.7849 | 12.91 |
| 2 | −1.1106 | 52.2679 | 33.76 |
| 3 | −0.3586 | 32.1940 | 26.22 |
| 4 | 0.0217 | 19.9130 | 20.27 |
| 5 | −0.3163 | 19.0267 | 13.76 |
| 6 | −0.7048 | 19.8629 | 8.12 |
| 7 | −0.7024 | 16.3704 | 4.66 |

TABLE 1-continued

| Frequency, Hz | a | b | c |
|---|---|---|---|
| 8 | −0.4184 | 14.8952 | 7.92 |
| 9 | −0.0636 | 11.6969 | 10.64 |
| 10 | 0.3307 | 8.9291 | 14.44 |
| (c) Roll Sinusoidal | | | |
| 1 | −2.31 | 5.85 | 1.239 |
| 2 | −0.18 | 4.70 | N/A |
| 3 | 0.28 | 2.50 | N/A |
| 4 | 0.35 | 2.35 | N/A |

Single axis discomfort to random vibration: It is convenient to express the discomfort response to random vibration in the vertical and lateral axes in the form of single equations obtained from multiple regression analyses. This provides a means for estimating discomfort response using bandwidths and center frequencies. The single relationships for random vertical vibration are $$D_{WR} = -1.75 + 0.857(CF) - 0.102(CF)^2 + 0.00346(CF)^3 + 33.4\ g_{rms} \quad (2)$$

and for random lateral vibration $$D_{VR} = 0.89 - 0.157(CF) + 0.016(BW) + 29.15\ g_{rms} \quad (3)$$

where $D_{WR}$, $D_{VR}$ = discomfort response to random vertical, lateral vibration;

CF = center frequency in Hz of applied random vibration;

BW = bandwidth in Hz of applied random vibration (defined by 10-dB downpoints); and $g_{rms}$ = root-mean-square level of applied vertical or lateral random vibration with each defined bandwidth Equation (2) is valid for center frequencies in the range of 2 to 13 Hz and bandwidths over the range of 2 to 10 Hz whereas equation (3) applies to center frequencies in the range of 2 to 9 Hz and bandwidths of 2 to 10 Hz.

Discomfort functions for random roll, pitch, and longitudinal vibrations are given by the following:

$$D_{\theta R} = 0.34 + 4.68\ \ddot{\theta}_{rms}; \text{ for } \ddot{\theta}_{rms} \geq 0.141\ rad/s^2 \quad (4)$$

$$D_{\theta R} = 7.04\ \ddot{\theta}_{rms}; \text{ for } \ddot{\theta}_{rms} < 0.141\ rad/s^2$$

$$D_{\phi R} = 0.41 + 5.07\ \ddot{\phi}_{rms}; \text{ for } \ddot{\phi}_{rms} \geq 0.116\ rad/s^2 \quad (5)$$

$$D_{\phi R} = 8.62\ \ddot{\phi}_{rms}; \text{ for } \ddot{\phi}_{rms} < 0.116\ rad/s^2$$

$$D_{uR} = -0.02 + 42.24\ (g_{rms})u \quad (6)$$

where $D_{\theta R}$, $D_{\phi R}$, $D_{uR}$ = the discomfort due to random vibration in the roll, pitch, and longitudinal axes, respectively;

$\ddot{\theta}_{rms}$ = root-mean-square acceleration level, in rad/s$^2$, of a random roll vibration having a bandwidth of 5 Hz and centered at 3 Hz;

$\ddot{\phi}_{rms}$ = root-mean-square acceleration level, in rad/s$^2$ of a random pitch vibration having a bandwidth of 5 Hz and centered at 3 Hz; and $(g_{rms})_u$ = root-mean-square acceleration level, in g, of a random longitudinal ($\pm$g) vibration having a bandwidth of 5 (or 10) Hz and centered at 5 Hz.

Combined-axes discomfort: Since many transportation vehicles contain vibrations in more than one axis at a time, a series of experiments was conducted to develop a reasonable procedure for estimating discomfort response to the combined-axes situation. Subjective reactions to combined vertical, lateral, roll vibrations were obtained from 126 subjects, and 54 subjects were used to obtain subjective reaction to combined vertical, longitudinal, pitch vibrations. The reason for the emphasis (in terms of subjects) on the vertical, lateral, roll combination arose from the fact that it is the most important in terms of vehicle ride quality.

The characteristics of the physical stimuli used in the combined axes experiments are given in Table 2 below for both axis combinations.

TABLE 2

| Axis Combination | Axes Included | Range of Acceleration Level | Center Frequency, Hz | Bandwidth, Hz |
|---|---|---|---|---|
| 1 | Vertical | 0.025–0.075 g | 3,5,7 | 2,5,10 |
|   | Lateral | 0.025–0.075 g | 3,5,7 | 2,5,10 |
|   | Roll | 0.02–0.50 rad/s² | 3 | 5 |
| 2 | Vertical | 0.025–0.075 g | 5 | 10 |
|   | Longitudinal | 0.025–0.075 g | 5 | 10 |
|   | Pitch | 0.02–0.50 rad/s² | 3 | 5 |

The subjective responses, together with the measured values of the physical stimulus factors, were used as input to both linear and polynomial multiple regression routines that computed various least-squares models to fit the empirical data. The model selected as best for general use in estimating discomfort response to various combinations of vertical, lateral, and roll vibrations is given by:

$$D_{WV\theta} = -0.44 + 1.65 \, D_{CI}, \text{ for } D_{CI} \geq 0.88 \, D \quad (7)$$

$$D_{WV\theta} = 1.14 \, D_{CI}, \text{ for } D_{CI} < 0.88 \, D \quad (8)$$

where $$D_{CI} = \sqrt{D^2_W + D^2_V + D^2_\theta} \quad (9)$$

Where $D_W$, $D_V$, $D_\theta$ are the discomfort levels due to multiple frequencies (computed by equation (19) below) within the vertical, lateral, and roll axes, respectively. Discomfort due to combined vertical, longitudinal, and pitch axes of motion can be estimated by the following equations:

$$D_{Wu\phi} = -1.07 + 1.77 \, D_{C2}, \text{ for } D_{C2} \geq 1.0 \, D \quad (10)$$

$$D_{Wu\phi} = 0.70 \, D_{C2}, \text{ for } D_{C2} < 1.0 \, D \quad (11)$$

where $$D_{C2} = \sqrt{D_W^2 + D^2_{uR} + D^2_{\phi R}} \quad (12)$$

Equations (7) and (10) are based upon experimental data which produced values of $D_{CI}$ in the range of 0.88 to 5.00 D and values of $D_{C2}$ over the range 1.00 to 5.00. Equations (8) and (11) represent reasonable approximations of discomfort response below discomfort threshold. The advantage of modeling combined axis discomfort response in terms of discomfort due to each individual axis of vibration is that computation of individual axis discomfort inherently accounts for the effects of vibration frequency. In addition, it increases the generality of the model, since values of $D_{WR}$, $D_{VR}$, etc., represent subjective units of discomfort which can result from any number of different ride spectra. For example, a model based upon physical descriptors such as vertical, lateral, and roll acceleration level would permit adequate estimation of discomfort response only for the particular vibration frequency spectra that were used to derive the model. Application of such a model to vibrations having different frequency characteristics could produce large errors in estimated discomfort.

Figure 3:
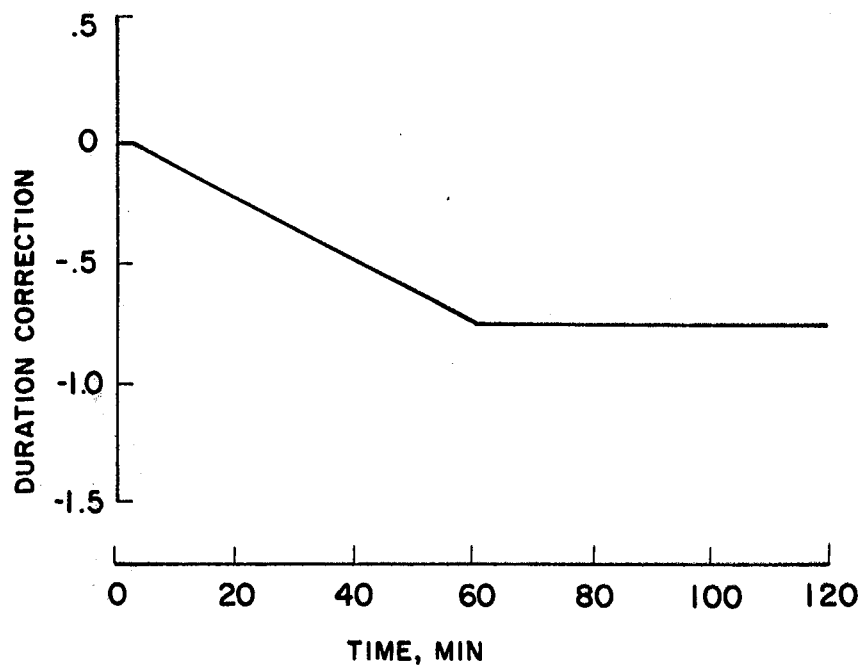
FIG. 3 is a graph showing the time duration correction needed to be made to the combined axis discomfort value.

Duration of vibration: An extensive study using 210 passenger subjects determined correction factors that were incorporated into the ride comfort modeling process to account for the effects of vibration duration. Their results indicated that subjects adapted to vibration ride environments having durations up to one hour. This adaptation process was independent of accelerating level and varied linearly with vibration duration, i.e., perceived discomfort decreased linearly with increasing vibration exposure time. The relationships describing the decrease in discomfort as a function of time for durations of up to 120 minutes are given by:

$$\Delta D_D = 0.0031 - 0.012t, \text{ for } 1 \leq t \leq 60 \text{ minutes} \quad (13)$$

and $$\Delta D_D = -0.72, \text{ for } 60 \text{ minutes} < t \leq 120 \text{ minutes} \quad (14)$$

where
$\Delta D_D$ = the duration correction at time t, and
$t$ = the duration in minutes of vibration.
The vibration duration correction corresponding to equations (13) and (14) is shown in FIG. 3. Note that at $t = 60$ minutes, the vibration duration correction is approximately $-0.72$ D. The corrections given by equations (13) and (14) provide reasonable estimates of the duration corrections for trip times up to 120 minutes. The assumption of a constant duration effect over the range of 60 to 120 minutes was believed to be justified on the basis of the fact that no significant effect of fatigue or further adaptation has been observed in any ride quality experiment that utilized subjects for test periods of two hours or more. Using the above correction, the total vibration discomfort, corrected for the effect of duration, is given by:

$$D_{Vib} = D_C + \Delta D_D \quad (15)$$

where
$D_{Vib}$ = total vibration discomfort in D corrected for the effect of duration; and
$D_C$ = vibration discomfort in D uncorrected for the effect of duration.

Combined noise/vibration: The approach used to define discomfort due to a combined noise and vibration environment was to expose passenger-subjects to various parametric combinations of noise and vibration and to obtain their subjective reactions to the total environment. These studies indicated that the discomfort due to the combined noise and vibration environment could be represented as a summation of discomfort components attributable to each of the physical components. Total discomfort in the combined environment was given by the following:

$$D_{Total} = D_{Vib} + D_N \quad (16)$$

where
$D_{Total}$ = the discomfort, in D, due to the combined noise and vibration environment; and $D_N$ = the contribution to total discomfort attributable to the noise, in D, present within a vibration environment.

The following paragraphs discuss the equations and procedures developed to estimate the noise discomfort contribution when the noise spectrum contains either a single octave band or contiguous octave bands.

Figure 4:
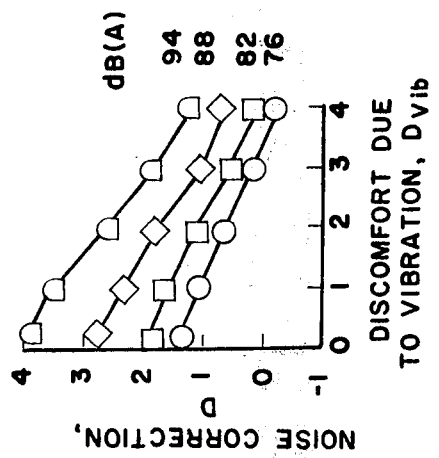
FIG. 4 is a graph of noise corrections as a function of the discomfort level due to the fibration component of the ride environment.

Noise discomfort contribution—single octave bands: A recent study derived a model of subjective discomfort response to combined noise and vibration that encompassed six octave bands of noise (63 to 2000 Hz) and a wide range of sinusoidal vibration. The metric used in that investigation was the A-weighted sound pressure level. It was found that noise discomfort varied with noise level, noise octave frequency, and the level of vibration present in the environment. Thus, it was necessary to model the interactive effects of the two physical stimuli in order to provide accurate estimation of total discomfort in the combined environment. The interactive effects of noise and vibration are illustrated in FIG. 4 which shows the noise discomfort correction as a function of vibration discomfort level for several noise levels. The noise discomfort correction varies in an approximately linear fashion with the level of vibration discomfort present in the ride environment. Consequently, the model selected to represent this effect and to estimate noise corrections due to a single octave band of noises is given by:

$$D_{N(i,j)} = a_i + b_i D_{Vib} WF_i \quad (17)$$

where $D_{N(i,j)}$ = noise discomfort due to the ith octave band having an A-weighted noise level of j dB in the presence of a vibration environment that produces a vibration discomfort level of $D_{Vib}$ $a_i, b_i$ = empirically determined coefficients; and $WF_i$ = a weighting factor that corrects for the effect of the ith noise octave band. The weighing factors are given in Table 3.

TABLE 3

| Octave Band Weighting Factors | |
|---|---|
| Octave Center Frequency, Hz | Weighting Factor |
| 63 | 1.470 |
| 125 | 0.963 |
| 250 | 0.786 |
| 500 | 0.646 |
| 1000 | 0.688 |
| 2000 | 1.448 |

Values of $a_i$ and $b_i$ are given in Table 4 for A-weighted noise levels ranging from 65 to 100 dB(A) and vibration discomfort levels from 0.5 to 4.0 D.

TABLE 4

| Values of Slope and Intercept for Equation 17 | | | | | |
|---|---|---|---|---|---|
| Noise Level dB(A) | Intercept a | Slope b | Noise Level dB(A) | Intercept a | Slope b |
| 65 | 0.3447 | −0.1219 | 83 | 2.2294 | −0.5118 |
| 66 | 0.4172 | −0.1445 | 84 | 2.3718 | −0.5329 |
| 67 | 0.4935 | −0.1669 | 85 | 2.5164 | −0.5533 |
| 68 | 0.5736 | −0.1893 | 86 | 2.6649 | −0.5738 |
| 69 | 0.6575 | −0.2116 | 87 | 2.8172 | −0.6145 |
| 70 | 0.7452 | −0.2337 | 88 | 2.9732 | −0.5942 |
| 71 | 0.8368 | −0.2558 | 89 | 3.1330 | −0.6346 |
| 72 | 0.9320 | −0.2777 | 90 | 3.2968 | −0.6547 |
| 73 | 1.0312 | −0.2995 | 91 | 3.4642 | −0.6746 |
| 74 | 1.1340 | −0.3212 | 92 | 3.6354 | −0.6944 |
| 75 | 1.2408 | −0.3429 | 93 | 3.8104 | −0.7142 |
| 76 | 1.3512 | −0.3644 | 94 | 3.9893 | −0.7338 |

TABLE 4-continued

| Values of Slope and Intercept for Equation 17 | | | | | |
|---|---|---|---|---|---|
| Noise Level dB(A) | Intercept a | Slope b | Noise Level dB(A) | Intercept a | Slope b |
| 77 | 1.4654 | −0.3858 | 95 | 4.1720 | −0.7533 |
| 78 | 1.5835 | −0.4071 | 96 | 4.3574 | −0.7724 |
| 79 | 1.7055 | −0.4284 | 97 | 4.5486 | −0.7921 |
| 80 | 1.8311 | −0.4494 | 98 | 4.7426 | −0.8113 |
| 81 | 1.9605 | −0.4704 | 99 | 4.9404 | −0.8304 |
| 82 | 2.0938 | −0.4913 | 100 | 5.1421 | −0.8494 |

Note that the noise discomfort contribution to total discomfort response requires that the discomfort due to the vibration components of the ride environment be computed first. This is done with the use of the equations and procedures discussed earlier.

Noise discomfort contribution—contiguous octave bands. The relationship used to compute the noise discomfort contribution to the total discomfort response when noise is present is more than one octave is given below:

$$D_N = D_{N(i,j)max} + 0.3[\Sigma D_{N(i,j)} - D_{N(i,j)max}] \quad (18)$$

where $D_N$ = the noise discomfort due to a continuous noise spectrum in the presence of a vibration environment that produces a discomfort level of $D_{Vib}$.

Note that $D_{N(i,j)}$ values are computed from equation (17) and $D_{N(i,j)max}$ represents the noise octave band that provides the greatest discomfort.

Equation (17) or (18) is sufficient to compute an estimate of the noise discomfort contribution to the total discomfort response. Application of equation (16) is then sufficient to estimate total discomfort response, and FIG. 1 can be used to determine the percentage of passengers finding that particular ride environment uncomfortable.

Multiple frequency vibrations: An accepted method for handling a vibration spectrum containing multiple frequency components is not presently available. The International Standards Organization (ISO, 1972) recommends that, for both discrete and narrowband vibration, the rms acceleration within each band (or frequency) be evaluated with respect to the appropriate limit of that band (or frequency). The implicit assumption in the ISO approach is that acceptability of a given ride environment is determined by the dominant component of the vibration spectrum. This assumes that no interactions occur between the discomfort produced by different frequencies. A recent study directly addressed the effects of multiple frequency vertical ($\pm g_z$) vibration upon subjective discomfort and examined the appropriateness of several candidate models for depicting such effects. Using a discomfort matching procedure, it was determined that the discomfort of many multiple frequency motions may be meaningfully expressed in terms of the equivalent level of a single frequency vibration. Specifically, the levels of a 10 Hz vibration that were equivalent to complex vibrations were found to be well predicted by the rms levels of the 10 Hz equivalent to the individual sinusoids present in the complex vibration. This approach is directly analogous to a vector summation of discomfort units due to individual frequency components within a single axis ride spectrum. It is, therefore, assumed that adequate prediction of discomfort due to multiple frequency components can be obtained from the following equation.

$$D_{WA} = \sqrt{\sum_{i=1}^{n} D_i^2} \quad (19)$$

where
- $D_{WA}$ = the within axis discomfort due to one or more narrowband random and discrete frequency components; and
- $D_i$ = the discomfort due to the ith narrowband or discrete frequency component within a given axis (computed from equations (1) to (6), where appropriate).

Figure 5:
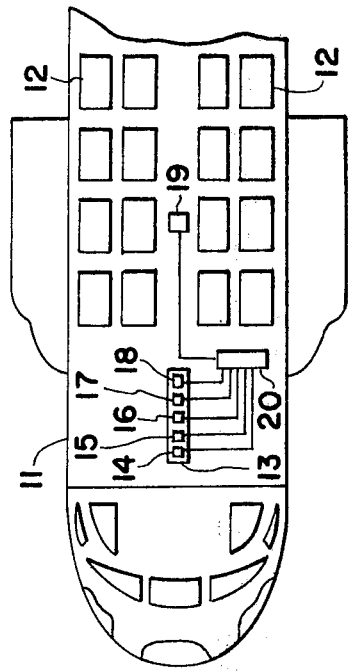
FIG. 5 is a schematic drawing of the use of the invention on a passenger vehicle.

Turning now to the embodiment of the invention selected for illustration the number 11 in FIG. 5 designates a vehicle (helicopter) having passenger seats 12 for the purpose of showing how the invention is to be used. The invention will display a reading which will be indicative of the discomfort experienced by passengers in seats 12 during a ride.

A transducer box 13 containing accelerometers 14-18 is placed on the vehicle such that accelerometer 14 produces an electrical signal $e_W$ proportional to the vehicle vertical acceleration, accelerometer 15 produces an electrical signal $e_V$ proportional to lateral acceleration, accelerometer 16 produces an electrical signal $e_u$ proportional to longitudinal acceleration, accelerometer 17 produces an electrical signal $e_\theta$ proportional to roll acceleration, and accelerometer 18 produces an electrical signal $e_\phi$ proportional to pitch acceleration. The noise pressure fluctuations interior to vehicle 11 are sensed by a microphone 19 which transforms the acoustical fluctuation into an electrical signal $e_N$. Electrical signals $e_W$, $e_V$, $e_u$, $E_\theta$, $E_\phi$ and $e_N$ are applied to a processing unit 20 which is disclosed in detail in FIGS. 6(a) and 6(b).

Figure 6A:
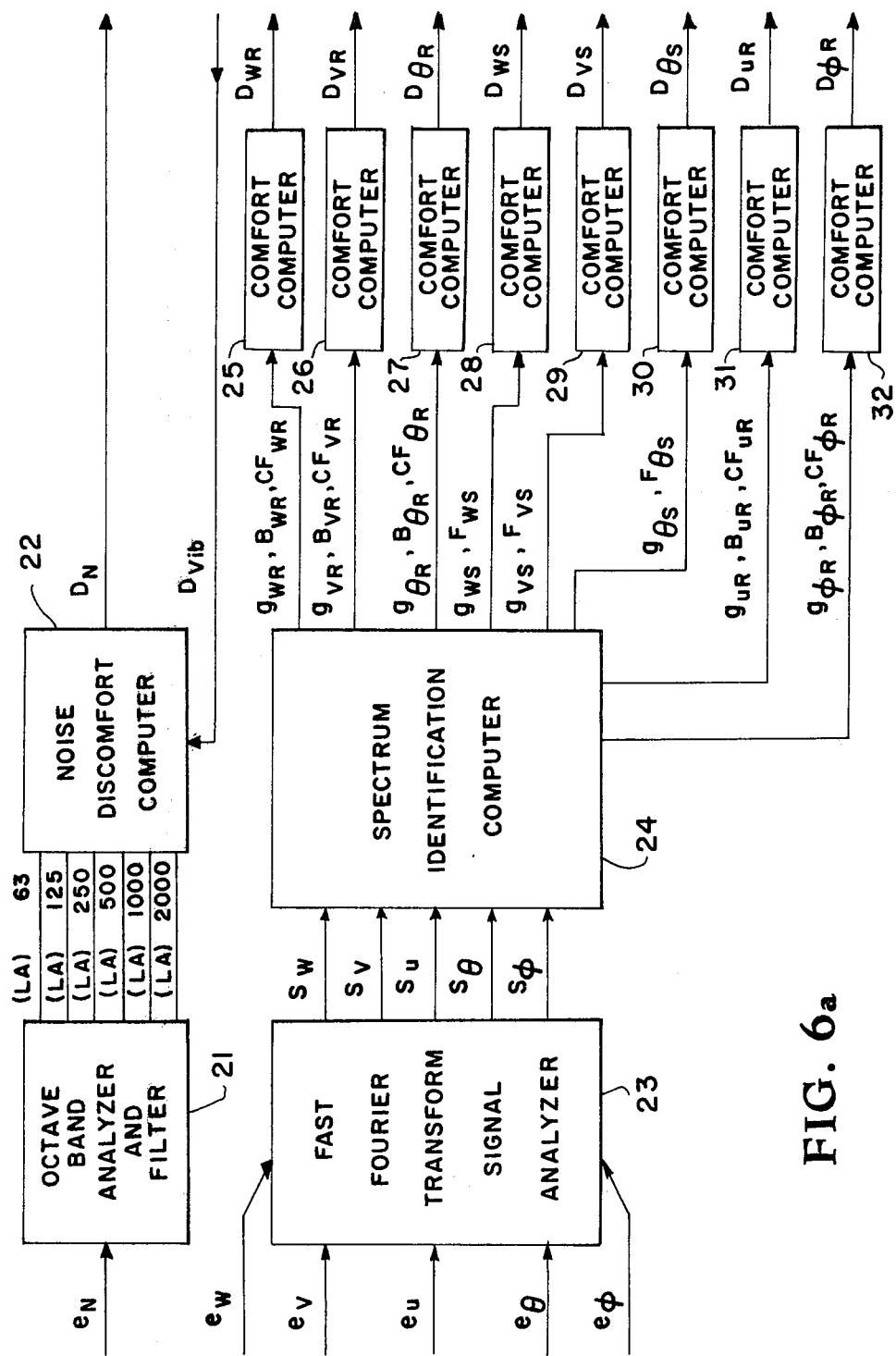
FIG. 6 (a) and (b) is a block diagram of the invention.
Figure 6B:
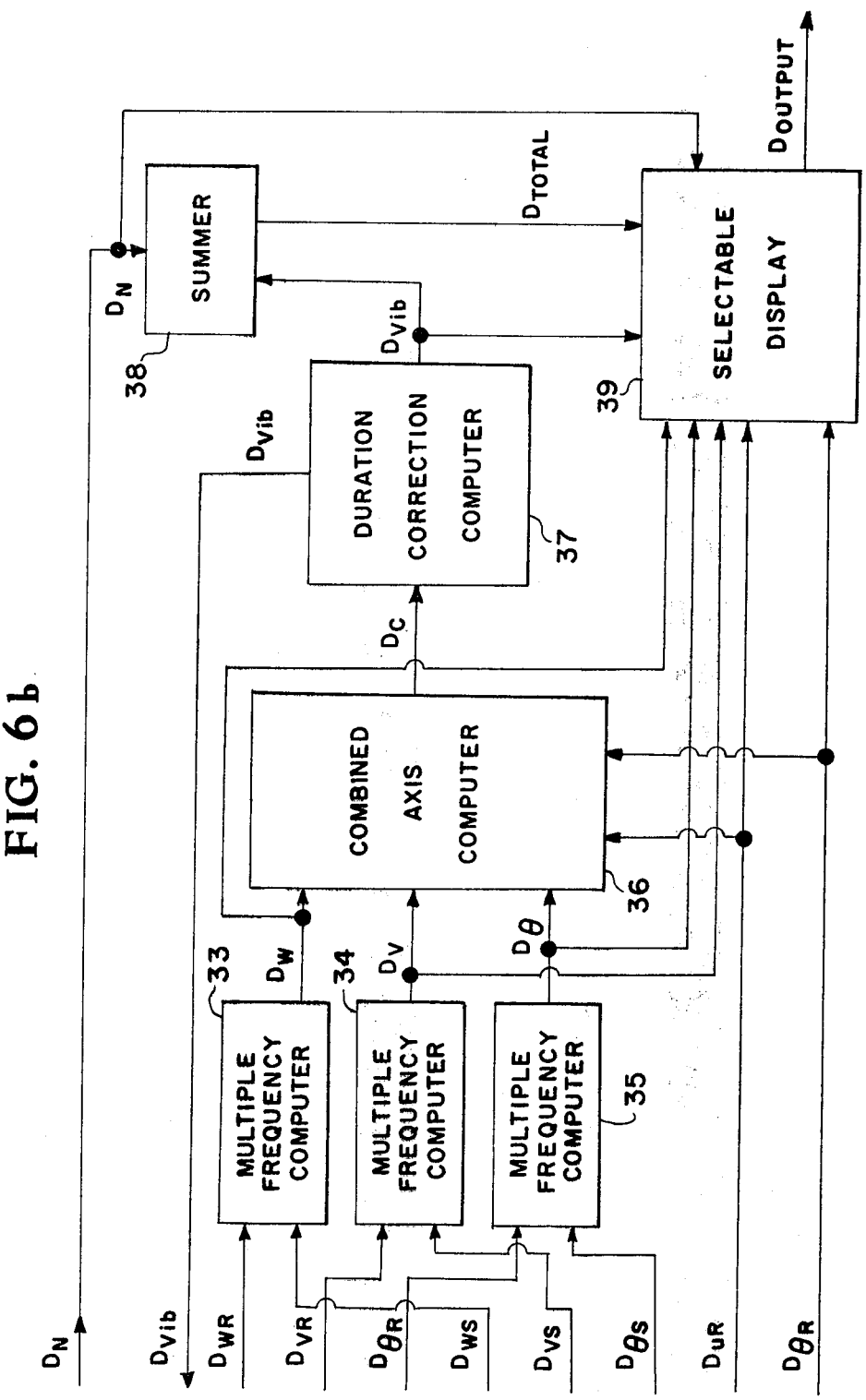

The electrical signal, $e_N$, corresponding to the acoustical pressure fluctuations is applied to the input of an octave band analyzer and filter 21 in FIG. 6(a) which outputs in digital form the A-weighted noise levels within 6 octave bands having center frequencies of 63, 125, 250, 500, 1000, and 2000 Hz. The six A-weighted noise levels, $(L_A)_{63}$, $(L_A)_{125}$, $(L_A)_{250}$, $(L_A)_{500}$, $(L_A)_{1000}$, $(L_A)_{2000}$, are then applied as input to a noise discomfort computer 22 which computes the subjective discomfort, $D_N$, due to the interior noise environment. The noise discomfort computer is programmed in accordance with equations (17) and (18) above to produce $D_N$. Note that the noise discomfort computer requires an additional input, namely the subjective discomfort level, $D_{Vib}$, produced by the vibration environment.

The electrical signals ($e_W$, $e_V$, $e_u$, $e_\theta$, and $e_\phi$) corresponding to each of the five vibration acceleration levels are applied to the input of a fast Fourier transform signal analyzer 23 which performs spectrum analyses of each of the signals and digitally outputs the power spectral density characteristics ($S_W$, $S_V$, $S_u$, $S_\theta$, $S_\phi$) of each signal. The power spectral density characteristics of each vibration are then applied to a spectrum identification computer 24 which identifies the random and discrete frequency components within each spectrum. Discrete frequency (or sinusoidal) components are identified in terms of the frequency (F) and root-mean-square (rms) level ($g_{Ws}$, $g_{Vs}$, $g_{\theta s}$) of each component. Random components are identified in terms of bandwidth ($B_{WR}$, $B_{VR}$, $B_{\theta R}$, $B_{uR}$, $B_{\phi R}$), center frequency ($CF_{WR}$, $CF_{VR}$, $CF_{\theta R}$, $CF_{uR}$, $CF_{\phi R}$), and root-mean-square level ($g_{WR}$, $g_{VR}$, $g_{\theta R}$, $g_{uR}$, $g_{\phi R}$) of each component. The spectrum identification module is a software element that scans the five spectral density digital outputs and performs the following functions: (1) identify the single maximum (peak) level within each spectrum; (2) estimate the bandwidth of the largest spectrum peak by defining it as the frequency range contained within the 10 dB downpoints of the peak; (3) identfy the center frequency as the midpoint frequency within the defined bandwidth; and (4) compute the root-mean-square acceleration level contained within the defined bandwidth by performing a numerical integration of the power spectrum between the lower and upper frequency limits of the defined bandwidth. The above procedure (steps (1) through (4) are repeated for additional peaks lying outside of the previously defined bandwidth. Bandwidths less than 2.0 Hz are treated as sinusoidal vibration and bandwidths equal to or greater than 2.0 Hz are treated as random vibration. Additional peaks that lie more than 20 dB below the maximum peak are ignored. The procedure described above serves to identify the random and discrete frequency characteristics of each power spectrum.

The random and discrete frequency characteristics of the vibrations are then applied to the appropriate comfort computers 25-31 which transform the physical vibration characteristics into subjective discomfort units $D_{WR}$, $D_{VR}$, $D_{\theta R}$, $D_{uR}$, $D_{\phi R}$ for random vibration and $D_{Ws}$, $D_{Vs}$, $D_{\theta s}$ for sinusoidal or discrete frequency vibrations.

Comfort computer 25 is programmed in accordance with equation (2) above to produce $D_{WR}$; comfort computer 26 is programmed in accordance with equation (3) to produce $D_{VR}$; comfort computer 27 is programmed in accordance with equation (4) to produce $D_{\theta R}$; comfort computer 28 is programmed in accordance with equations (1a) and (1b) with Table 1(a) to produce $D_{Ws}$; comfort computer 29 is programmed in accordance with equations (1a) and (1b) with Table 1(b) to produce $D_{Vs}$; comfort computer 30 is programmed in accordance with equations (1a) and (1b) with Table 1(c) to produce $D_{\theta s}$; comfort computer 31 is programmed in accordance with equation (6) to produce $D_{uR}$; and comfort computer 32 is programmed in accordance with equation (5) to produce $D_{\phi R}$.

The vertical discomfort values $D_{WR}$ and $D_{Ws}$ (outputs of comfort computers 25 and 28) are applied to a multiple frequency computer 33 which outputs the subjective discomfort, $D_W$, due to multiple frequencies of vibration in the vertical axis. Similarly, $D_{VR}$ and $D_{Vs}$ (outputs of comfort computers 26 and 29) are applied to multiple frequency computer 34 which outputs the subjective discomfort, $D_V$, due to lateral vibration; and $D_{\theta R}$ and $D_{\theta s}$ (outputs of comfort computers 27 and 34) are applied to multiple frequency computer 35 which outputs the subjective discomfort, $D_\theta$, due to roll vibration. The three multiple frequency computers are programmed in accordance with equation (19) above. The values $D_W$, $D_V$, $D_\theta$, $D_{uR}$ and $D_{\phi R}$ are applied to the inputs of a combined axis computer 36 which outputs the total discomfort, $D_c$, due to the combined axis vibrations. The combined axis computer 36 is programmed in accordance with equations (7) through (12) above. In programming computer 36

$$D_{c2} = \sqrt{D_{uR}^2 + D_{\phi R}^2} \text{ and } D_c = \sqrt{D_{WV\theta}^2 + D_{u\phi}^2}$$

The combined axis discomfort, $D_c$, is then applied to the duration correction computer 37 which outputs the total duration corrected discomfort due to vibration, $D_{Vib}$. The duration correction computer is programmed in accordance with equations (13) through (15) above.

The output of the duration correction computer $D_{vib}$, is applied to the noise discomfort computer 22 to be used in the generation of the noise discomfort contribution, $D_N$. The noise component of discomfort, $D_N$, is then algebrically summed with the vibration component of discomfort, $D_{vib}$, by a summer 38 to generate the total subjective discomfort, $D_{total}$, attributable to the measured noise and vibration environment. The $D_{total}$ signal is then applied to a visual selectable display 39 which can, in addition to displaying $D_{total}$, also displays selected values of discomfort produced at earlier stages in the meter, i.e., the output display is selectable. Options for display include: $D_{total}$, $D_{Vib}$, $D_{noise}$, $D_W$, $D_V$, $D_\theta$, $D_{uR}$, $D_{\phi R}$.

The octave band analyzer and filter 21 which includes an analog-to-digital converter, the fast Fourier transform analyser 23 which includes an analog-to-digital converter, the summer 38 and the selectable display 39 are all well known and commercially available, and hence are not disclosed in detail in this application.

The principal advantages of this invention over the prior art are: Its output is in terms of subjective discomfort units which directly relate to passenger subjective acceptance of the measured environment; its output is derived from direct software implementation of the detailed psychophysical laws governing human subjective comfort response to combined noise and vibration; its complete recording, analysis, and transformation of measured data into subjective units is accomplished on board the vehicle and in real time; it is very sensitive to slight changes and/or differences in the physical characteristics (e.g., frequency content, level) of the environment under measurement; it is very useful in design tradeoff studies and for comparative evaluations of differing ride environments; its effects of multiple frequencies and multiple axes of vibration are automatically accounted for within the meter; and it automatically accounts for the combined effects of noise and vibration.

What is claimed is:

1. A meter for measuring the ride quality of a passenger vehicle comprising:
   means on said vehicle for producing an electrical signal proportional to the noise level on said vehicle;
   means on said vehicle for producing several electrical signals proportional to vibrations on said vehicle; and
   means for combining said electrical signal proportional to noise and said several electrical signals proportional to vibrations to obtain a total discomfort value indicative of the ride quality of said passenger vehicle.

2. A meter for measuring the ride quality of a passenger vehicle according to claim 1 wherein said means for producing several electrical signals proportional to vibrations on said vehicle includes several accelerometers with each producing an electrical signal proportional to acceleration relative to a single axis.

3. A meter for measuring the ride quality of a passenger vehicle according to claim 2 wherein said means for combining said electrical signal proportional to noise and said several electrical signals proportional to vibrations comprises means receiving said electrical signals proportional to vibrations for producing a discomfort value for each of said accelerations relative to a single axis; means receiving said discomfort values relative to a single axis for producing a combined axis discomfort value; means receiving said electrical signal proportional to noise level and said combined axis discomfort value for producing a noise discomfort value; and means for combining said combined axis discomfort value and said noise discomfort value to obtain said total discomfort value.

4. A meter for measuring the ride quality of a passenger vehicle according to claim 3 wherein said means for producing a combined axis discomfort value includes means for producing a combined axes discomfort value that is corrected for time duration.

5. A meter for measuring ride quality of a passenger vehicle according to claim 4 wherein said means for producing a noise discomfort value comprises an octave band analyzer and filter for dividing said electrical signal proportional to noise level into several octave bands and a noise discomfort computer receiving said several octave bands and said combined axis discomfort value that is corrected for time duration for generating said noise discomfort value.

6. A meter for measuring ride quality of a passenger vehicle according to claim 5 wherein said means for producing a discomfort value for each of said accelerations relative to a single axis comprises a fast Fourier transform signal analyzer receiving said several signals proportional to vibrations for producing the power spectral density characteristics of each of said several signals; a spectrum identification computer receiving said power spectral density characteristics for producing values that identify the random and sinusoidal frequency components within each spectrum; and means receiving the last mentioned values for producing said discomfort value for each of said accelerations.

7. A meter for measuring ride quality of a passenger vehicle according to claim 6 wherein said means for producing said discomfort value for each of said accelerations includes means receiving said values that identify the random and sinusoidal frequency components within each spectrum for producing said discomfort values for each of said accelerations relative to a single axis.

8. A meter for measuring ride quality of a passenger vehicle according to claim 7 including means for selectably displaying the values: total discomfort value, discomfort values for the single axis, noise discomfort value; combined axis discomfort value; and combined axis discomfort value corrected for time duration.

* * * * *